United States Patent
Bhattad et al.

(10) Patent No.: US 9,148,205 B2
(45) Date of Patent: Sep. 29, 2015

(54) FEEDBACK FOR SUPPORTING SU-MIMO AND MU-MIMO OPERATION IN WIRELESS COMMUNICATION

(75) Inventors: Kapil Bhattad, San Diego, CA (US); Peter Gaal, San Diego, CA (US); Alexei Yurievitch Gorokhov, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 13/011,595

(22) Filed: Jan. 21, 2011

(65) Prior Publication Data

US 2012/0020433 A1    Jan. 26, 2012

Related U.S. Application Data

(60) Provisional application No. 61/298,055, filed on Jan. 25, 2010.

(51) Int. Cl.
*H04L 25/49* (2006.01)
*H04B 7/04* (2006.01)
*H04B 7/06* (2006.01)

(52) U.S. Cl.
CPC .......... *H04B 7/0417* (2013.01); *H04B 7/0639* (2013.01)

(58) Field of Classification Search
CPC .................. H04B 7/0417; H04B 7/0639
USPC ........................... 375/260, 267, 296
IPC .................. H04B 7/0417, 7/0639; H04L 25/49
See application file for complete search history.

(56) References Cited

U.S. PATENT DOCUMENTS

| | | | |
|---|---|---|---|
| 2003/0078006 A1 | 4/2003 | Mahany et al. | |
| 2007/0097856 A1 | 5/2007 | Wang et al. | |
| 2008/0232503 A1* | 9/2008 | Kim | 375/267 |
| 2008/0285667 A1* | 11/2008 | Mondal et al. | 375/260 |
| 2009/0147880 A1 | 6/2009 | Wennstrom et al. | |
| 2009/0286482 A1 | 11/2009 | Gorokhov et al. | |

(Continued)

FOREIGN PATENT DOCUMENTS

| | | |
|---|---|---|
| CN | 1914842 A | 2/2007 |
| GB | 2456217 A | 7/2009 |

(Continued)

OTHER PUBLICATIONS

"LTE for 4G Mobile Broadband", Farooq Khan, Mar. 26, 2009, http://my.safaribooksonline.com/book/electrical-engineering/communications-engineering/9780511512667, ISBN 978-0-521-88221-7, Cambridge University Press.*

(Continued)

*Primary Examiner* — Shuwang Liu
*Assistant Examiner* — Ross Varndell
(74) *Attorney, Agent, or Firm* — Liem T. Do

(57) ABSTRACT

A method, an apparatus, and a computer program product for wireless communication are provided in which a precoding matrix is determined from a set of precoding matrices with a first throughput based on a reference signal. In addition, a subset of precoding matrices is determined from the set of precoding matrices with a second throughput greater than a fraction of the first throughput based on the reference signal. Furthermore, a precoding matrix is selected from the subset of precoding matrices based on a metric.

37 Claims, 19 Drawing Sheets

(56) References Cited

U.S. PATENT DOCUMENTS

| | | | | |
|---|---|---|---|---|
| 2010/0091893 | A1* | 4/2010 | Gorokhov | 375/260 |
| 2010/0284351 | A1* | 11/2010 | Liang et al. | 370/329 |
| 2011/0149765 | A1 | 6/2011 | Gorokhov et al. | |
| 2011/0261894 | A1* | 10/2011 | Yu et al. | 375/267 |

FOREIGN PATENT DOCUMENTS

| | | |
|---|---|---|
| JP | 2011512692 A | 4/2011 |
| JP | 2012531800 A | 12/2012 |
| WO | WO-2007051208 A2 | 5/2007 |
| WO | 2008116181 A2 | 9/2008 |
| WO | WO-2009096601 A1 | 8/2009 |
| WO | WO-2011090106 A1 | 7/2011 |

OTHER PUBLICATIONS

International Search Report and Written Opinion—PCT/US2011/022468—ISA/EPO —Jun. 17, 2011.

Kobayashi et al., "Throughput Maximization Transmission Control Scheme Using Precoding for MIMO Systems", 2007 IEEE, pp. 5098-5102.

Lu et al., "Closed Loop Transmission for LTE System Downlink", Wireless Conference, 2009. EW 2009. European, Date of Conference: May 17-20, 2009, Centre for Wireless Communication, Univ. of Oulu, Oulu, Finland, pp. 314-318.

Nortel: "Further discussion on the Differential feedback of PMI for LTE Downlink Closed-Loop MIMO", 3GPP DRAFT; R1-073292(Nortel-Diff Feedback), 3rd Generation Partership Project (3GPP), Mobile Competence Centre; 650, Route Des Lucioles; F-06921 Sophia-Antipolis Cedex; France, vol. RAN WGI, no. Athens, Greece; Aug. 15, 2007, XP050106925, [retrieved on Aug. 15, 2007].

Qualcomm Inc: "Codebook Design for DL LTE-A operation", 3GPP Draft; R1-100753, 3rd Generation Partnership Project (3GPP), Mobile Competence Centre ; 650, Route Des Lucioles ; F-06921 Sophia-Antipolis Cedex ; France, vol. RAN WGI, no. Valencia, Spain; Jan. 18, 2010, Jan. 21, 2010, XP050418387, [retrieved on Jan. 21, 2010].

Sony Corporation, "UE Feedback Extension for SU/Mu-MIMO,"R1-101019, Version 7.2.4.1.2, 3GPP TSG RAN WG1 #60, San Francisco, USA, Feb. 22-26, 2010, 6 pages.

Taiwan Search Report—TW100102673—TIPO—Aug. 7, 2013.

Samsung, "Discussion on Feedback Testing Procedure", 3GPP TSG RAN WG1 # 60, R1-101169, San Francisco, USA, Feb. 26, 2010, pp. 1-3.

* cited by examiner

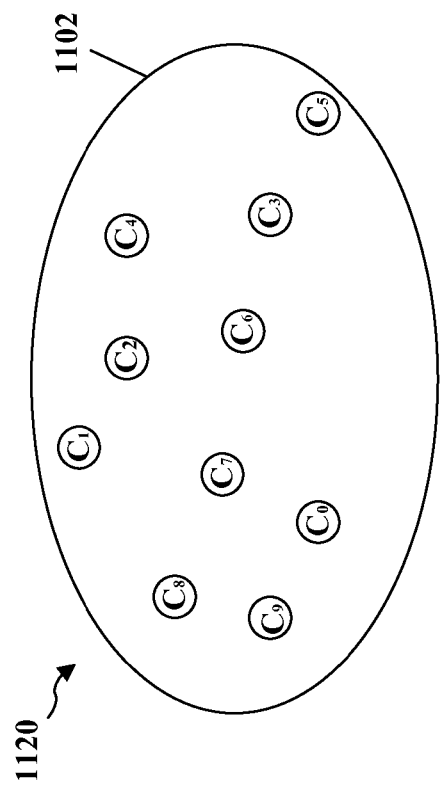
FIG. 15
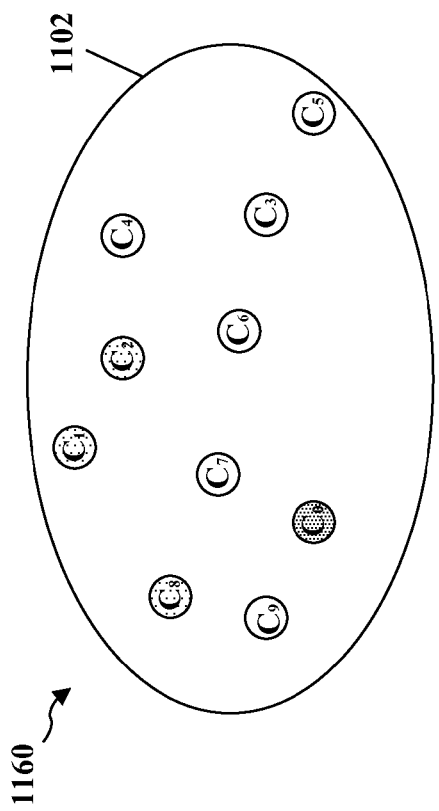
FIG. 17
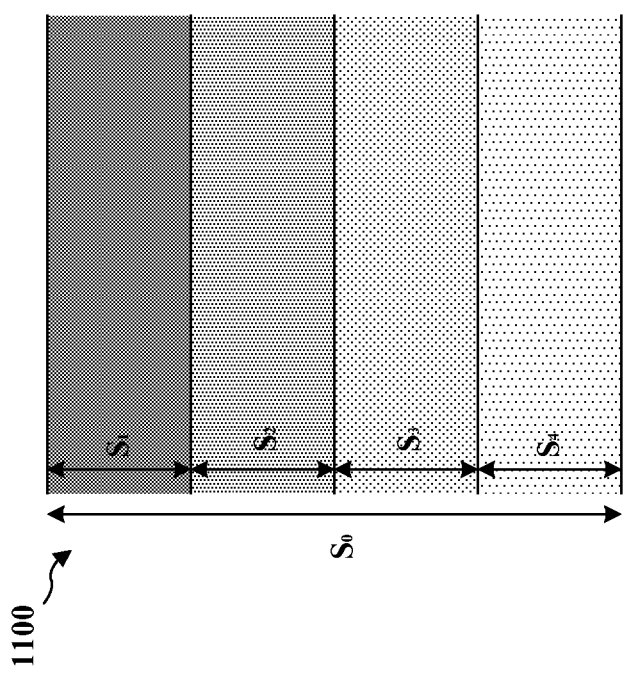
FIG. 14
|    | $C_0$ | $C_1$ | — | — | $C_9$ |
|---|---|---|---|---|---|
| $S_1$ | 50%  | 95%  |   |   | 40% |
| $S_2$ | 100% | 95%  |   |   | 30% |
| $S_3$ | 90%  | 95%  |   |   | 20% |
| $S_4$ | 150% | 95%  |   |   | 25% |
| Total | 390% | 380% |   |   | 115% |
FIG. 16

FEEDBACK FOR SUPPORTING SU-MIMO AND MU-MIMO OPERATION IN WIRELESS COMMUNICATION

CROSS-REFERENCE TO RELATED APPLICATION

This application claims the benefit of U.S. Provisional Application Ser. No. 61/298,055, entitled "Feedback for Supporting SU-MIMO and MU-MIMO Operation in a Wireless Communication System," filed on Jan. 25, 2010, which is expressly incorporated by reference herein in its entirety.

BACKGROUND

1. Field

The present disclosure relates generally to communication systems, and more particularly, to feedback for supporting single-user (SU) multiple-input multiple-output (MIMO) and multi-user (MU) MIMO operation in a wireless communication system.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and MIMO antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, an apparatus, and a computer program product for wireless communication are provided in which a precoding matrix is determined from a set of precoding matrices with a first throughput based on a reference signal. In addition, a subset of precoding matrices is determined from the set of precoding matrices with a second throughput greater than a fraction of the first throughput based on the reference signal. Furthermore, a precoding matrix is selected from the subset of precoding matrices based on a metric.

BRIEF DESCRIPTION OF THE DRAWINGS

FIGS. 14-17 are diagrams illustrating another exemplary method for providing feedback for MIMO operation.

DETAILED DESCRIPTION

Figure 1:
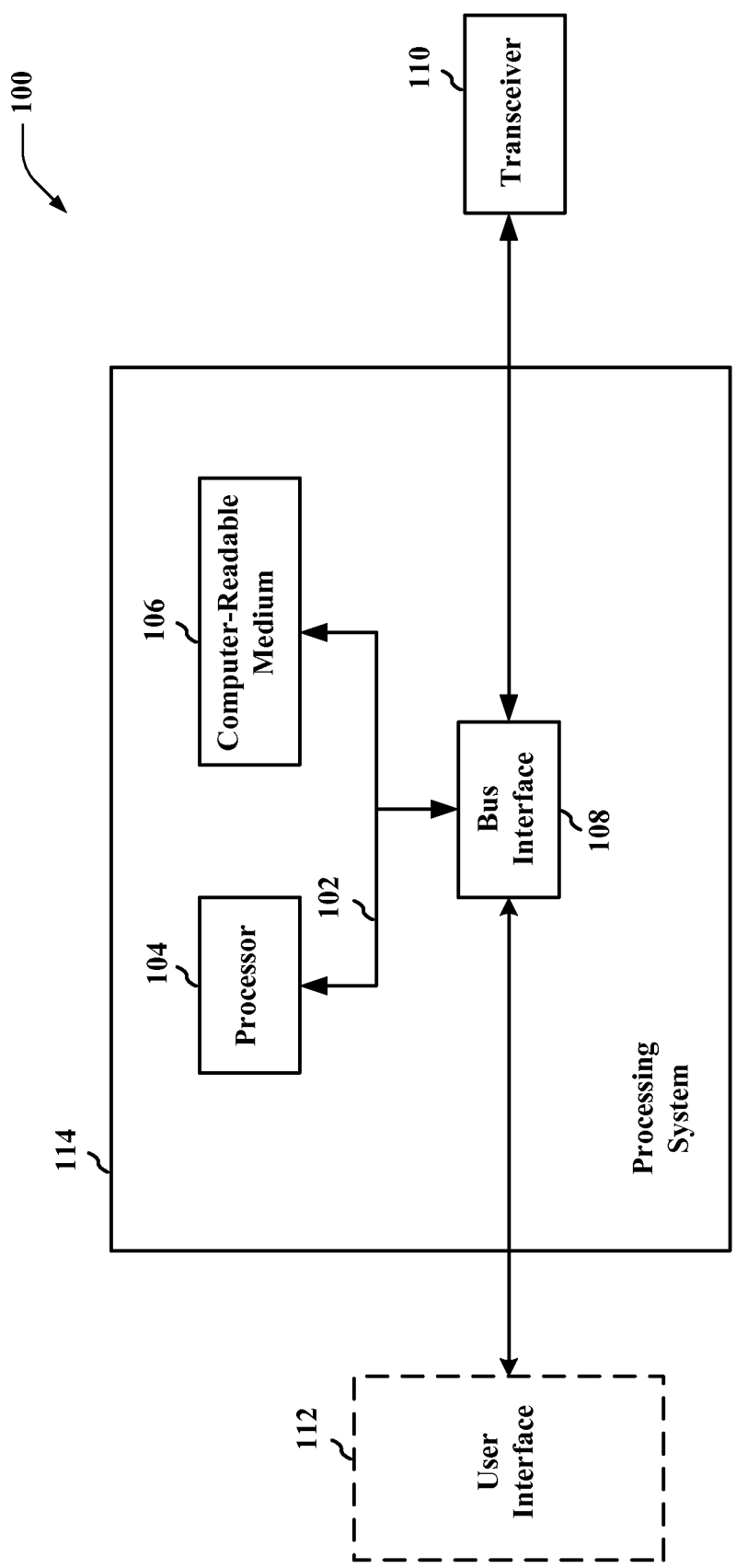
FIG. 1 is a block diagram illustrating an example hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

FIG. 1 is a block diagram illustrating an example of hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
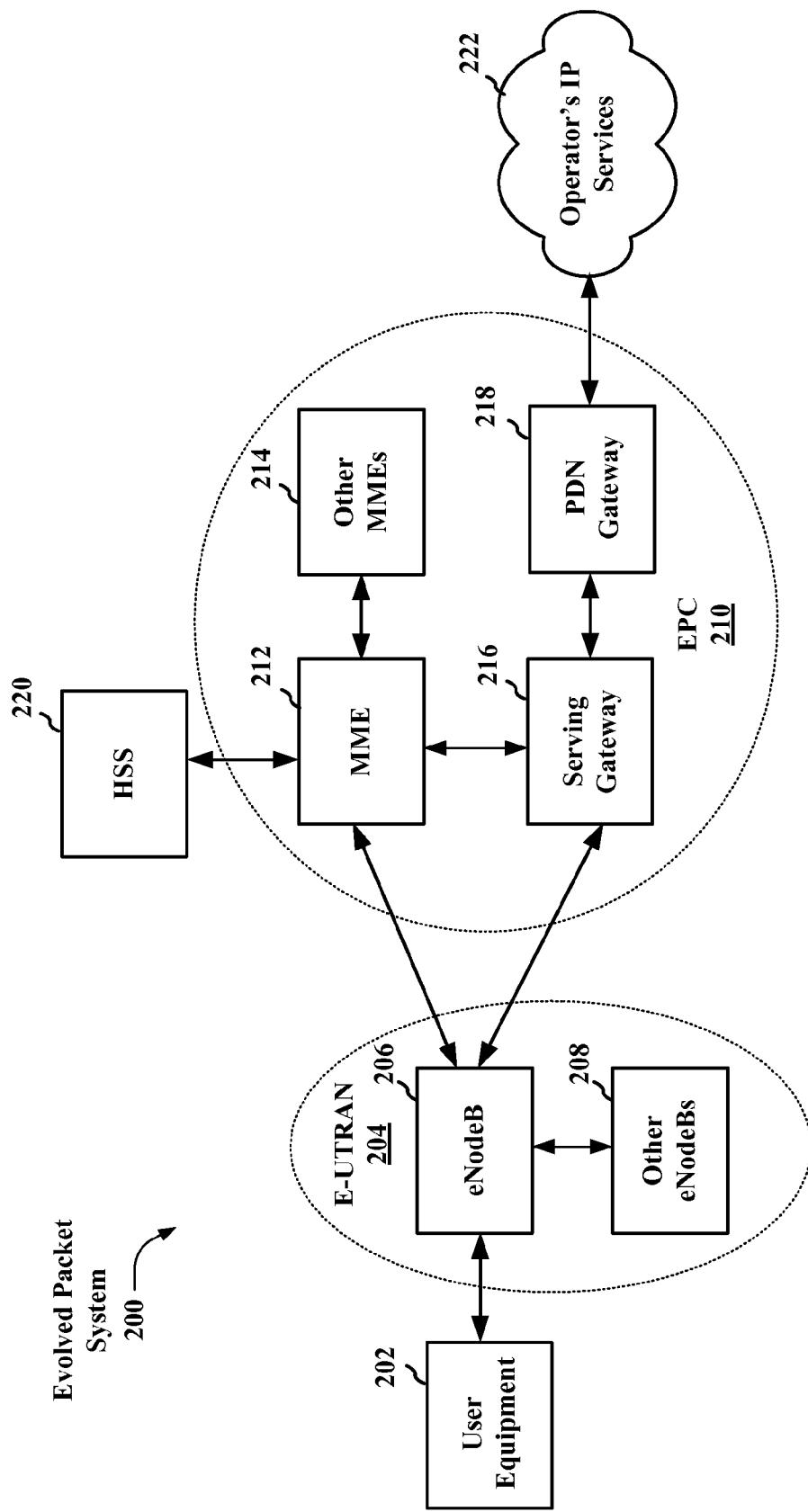
FIG. 2 is a diagram illustrating an example of a network architecture.

FIG. 2 is a diagram illustrating an LTE network architecture employing various apparatuses (such as apparatus 100 of FIG. 1). The LTE network architecture may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS 200 can interconnect with other access networks, but for simplicity those entities/interfaces are not shown. As shown, the EPS 200 provides packet-switched services, however, as those skilled in the art will readily appreciate, the various concepts presented throughout this disclosure may be extended to networks providing circuit-switched services.

The E-UTRAN includes an evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for the UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
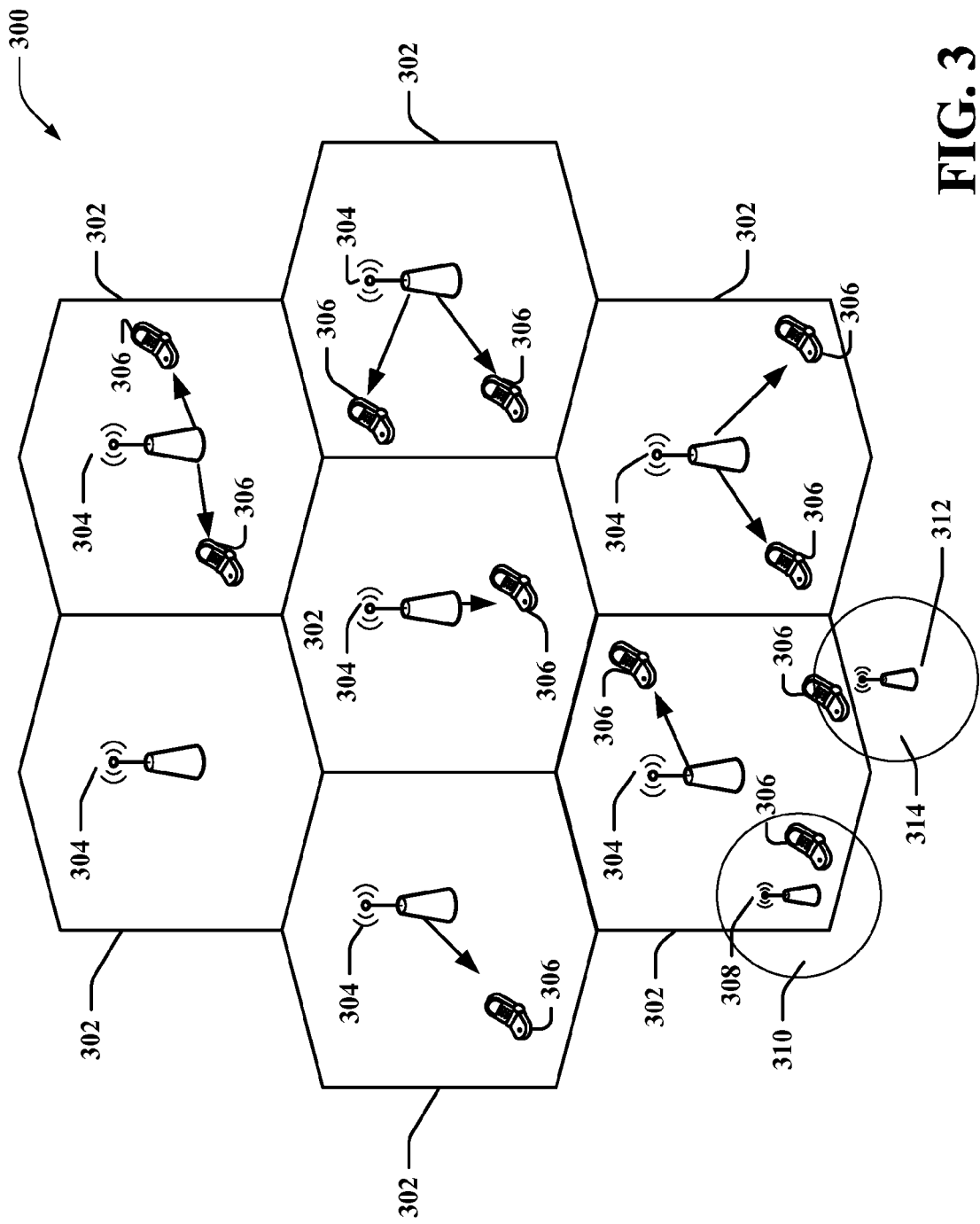
FIG. 3 is a diagram illustrating an example of an access network.

FIG. 3 is a diagram illustrating an example of an access network 300 in an LTE network architecture. In this example, the access network 300 is divided into a number of cellular regions (may be referred to as cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 (see FIG. 2) for all the UEs 306 in the cell 302. There is no centralized controller in this example of the access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
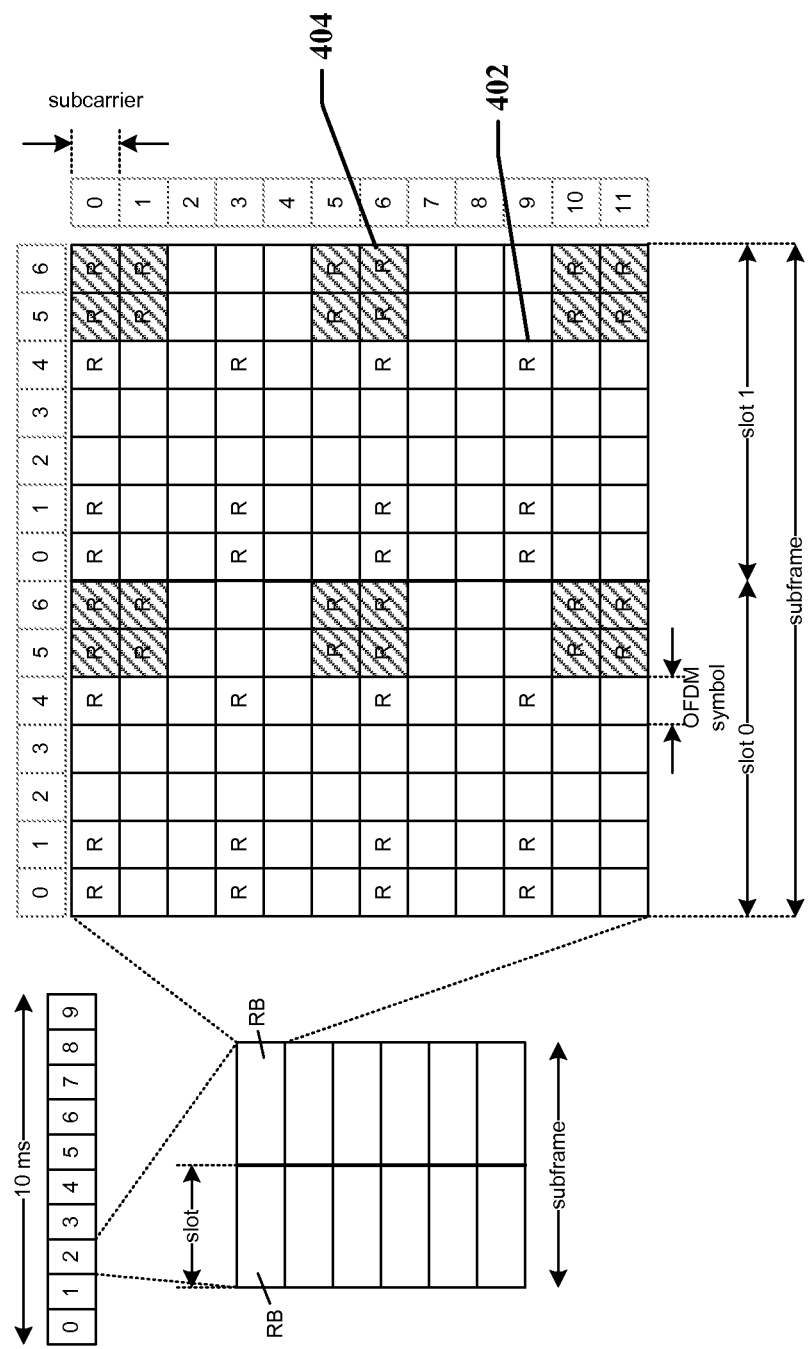
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also referred to as common RS) 402 and UE-specific RS (UE-RS) 404. UE-RS 404 are transmitted on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
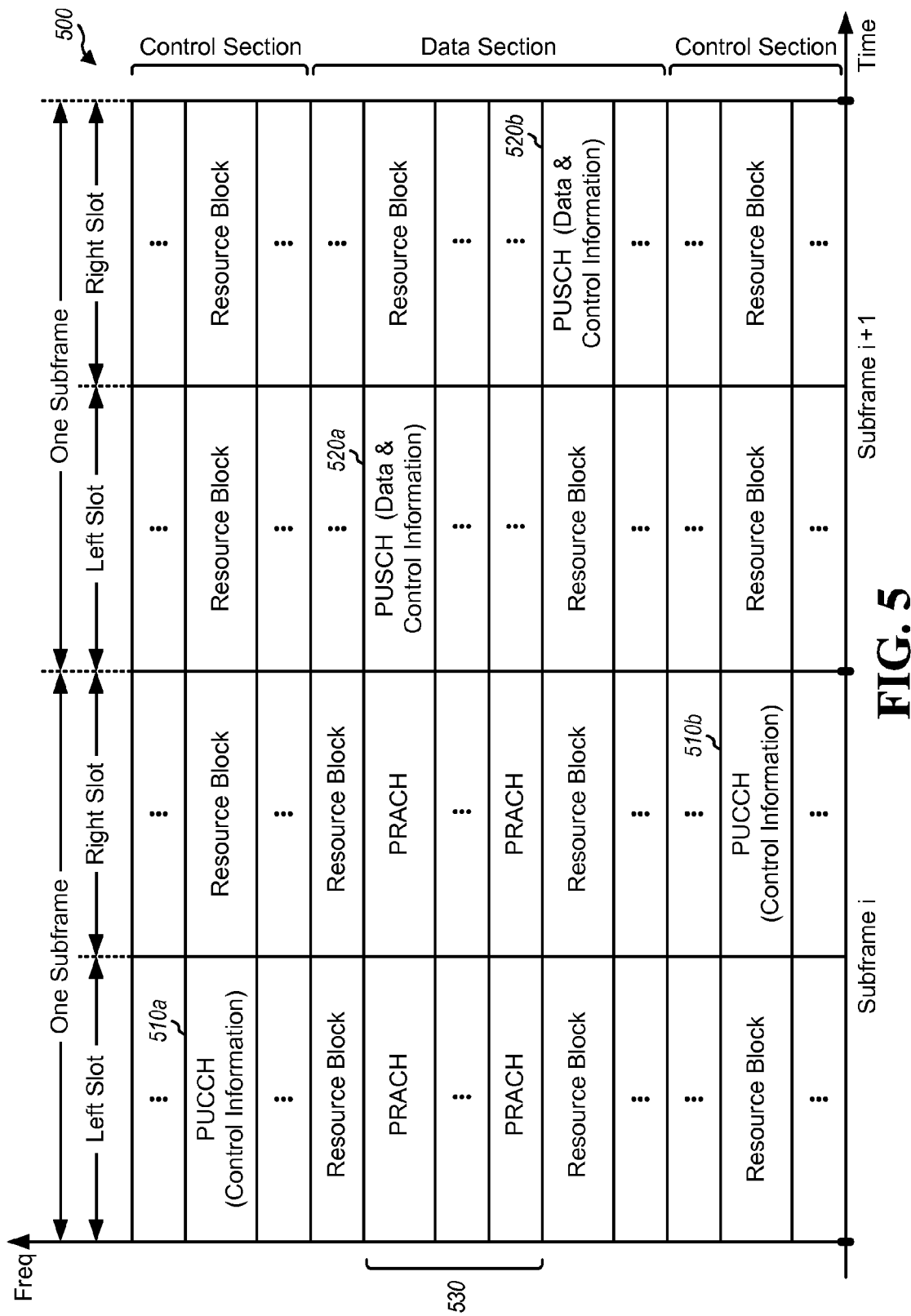
FIG. 5 is a diagram illustrating an example format for an uplink structure in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
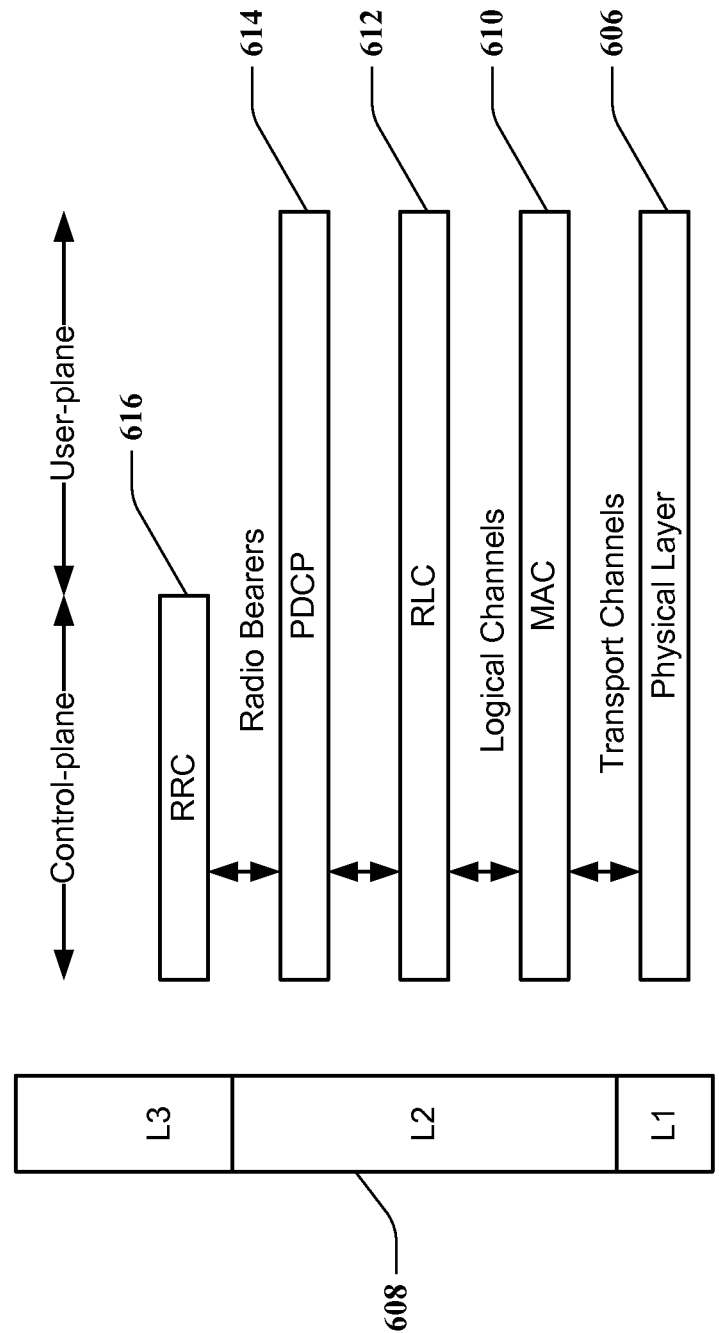
FIG. 6 is a diagram illustrating an example of a radio protocol architecture for a user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
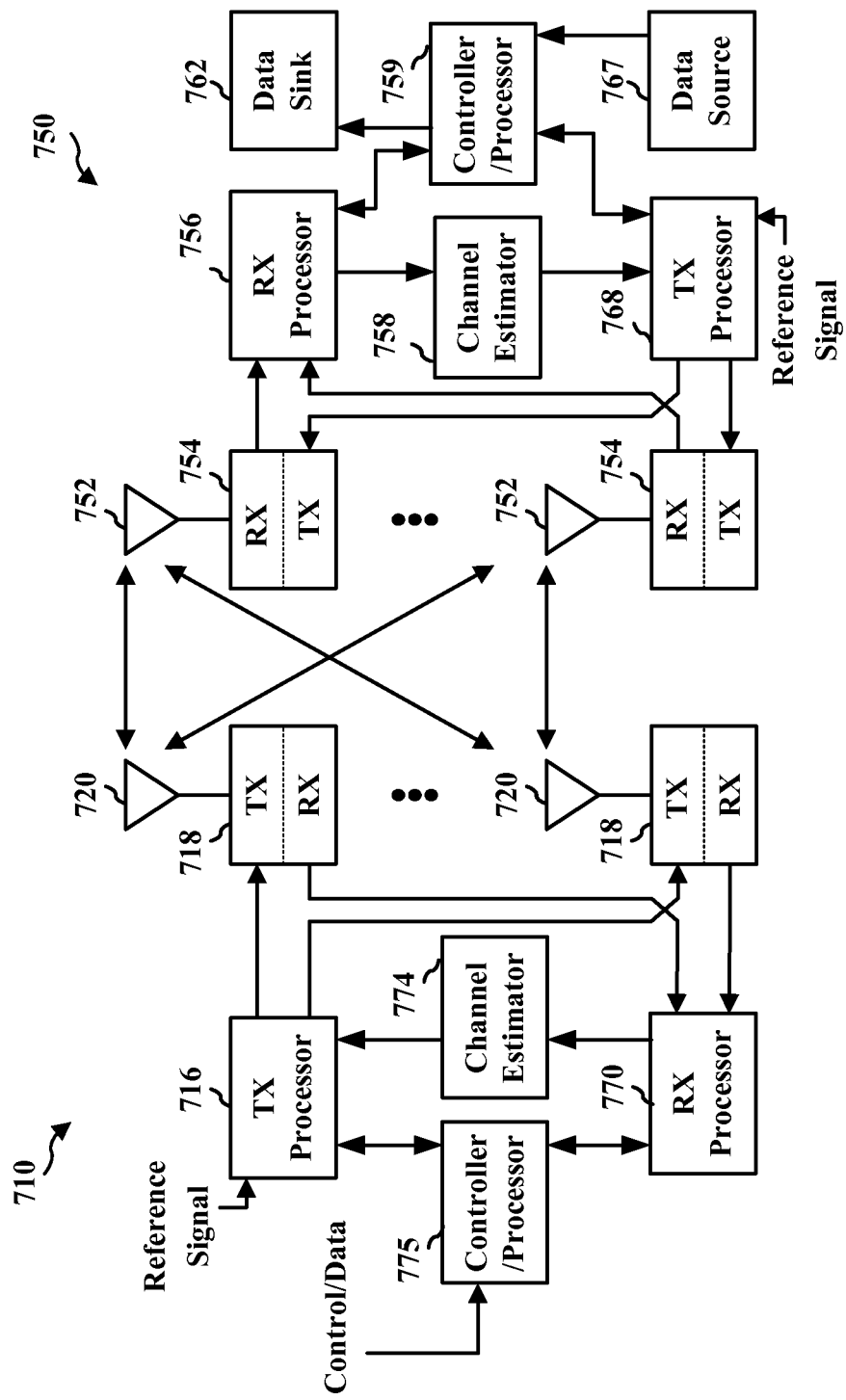
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations. The processing system 114 described in relation to FIG. 1 may include the UE 750. In particular, the processing system 114 may include the TX processor 768, the RX processor 756, and the controller/processor 759.

In multi-antenna wireless communication systems, spatial multiplexing can be used to increase the spectral efficiency. Spatial multiplexing refers to transmitting multiple streams (typically independently encoded data) along different beams. A beam is defined by a scaling of an amplitude and a phase corresponding to each antenna. Antenna-specific weighting of an amplitude and a phase are applied to different data streams and the data streams are mapped to different antennas. A signal is said to be transmitted along a beam if the signal is transmitted on all antennas using the scaling corresponding to each antenna. A spatial multiplexing scheme is referred to as a SU-MIMO scheme when all streams transmitted are for a single user and is referred to as a MU-MIMO scheme when two or more streams are transmitted of which at least two streams are meant for two different users.

Figure 8:
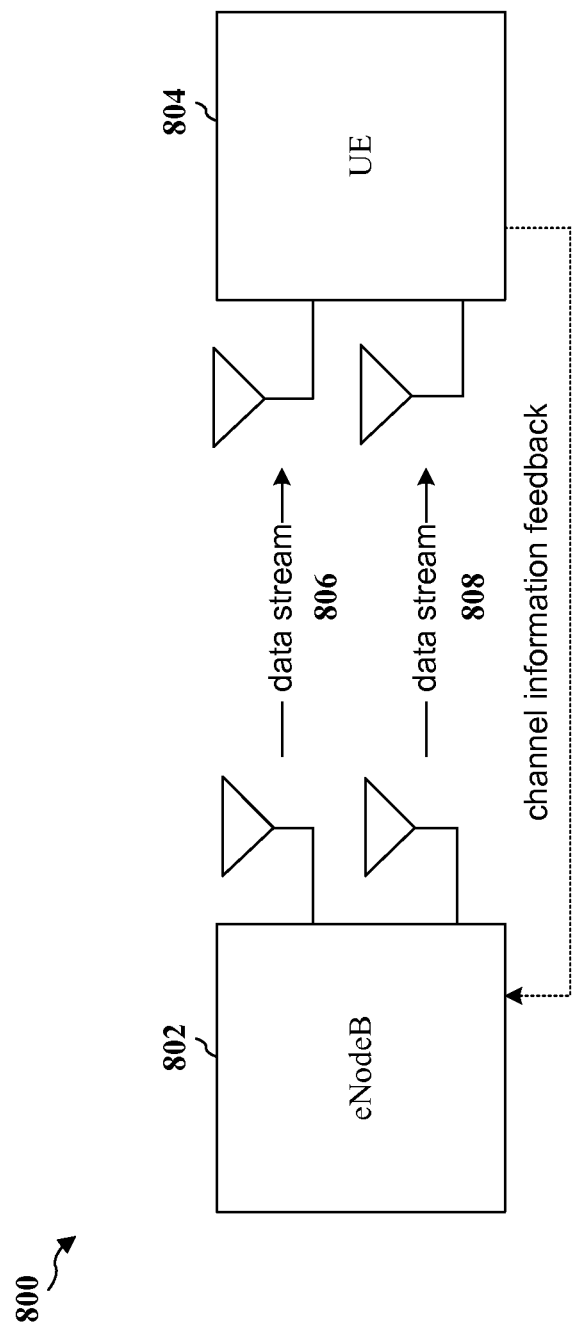
FIG. 8 is a diagram for illustrating SU-MIMO.

FIG. 8 is a diagram 800 for illustrating SU-MIMO. As shown in FIG. 8, an eNodeB 802 may utilize SU-MIMO to transmit simultaneously data stream 806 and data stream 808 to a UE 804. The beams used to transmit the data to the UE 804 must be chosen carefully in order to obtain the best performance. The optimal beams to use depend on the channel realization of the UE 804. However, the channel knowledge may not be available at the eNodeB 802. When the channel knowledge is not available at the eNodeB 802, the eNodeB 802 may rely on some form of feedback from the UE 804. Accordingly, the UE 804 sends back channel information feedback to the eNodeB 802 so that the eNodeB 802 can adjust the scaling of the beams to improve performance. For SU-MIMO, the UE 804 sends a rank index (RI), precoding matrix indicator (PMI), and a channel quality indicator (CQI). A set of codebooks is defined that contains several different precoding matrices corresponding to each rank. The rank is the number of data streams (also referred to as layers) that are transmitted. The maximum rank supported is the minimum of the number of transmit antennas $N_t$ and the number of receive antennas $N_r$. A precoding matrix for rank r is an $N_t \times r$ matrix, where each column of the precoding matrix corresponds to a beam. The UE 804 measures the channel on the DL using reference signals (pilots for each antenna port) transmitted by the eNodeB 802. The UE 804 then searches over all rank and precoding matrix combinations to find the rank and precoding matrix that has the best performance. The best rank and precoding matrix combination is typically the rank and precoding matrix that provides the best sum rate throughput over all streams and over the configured reporting bandwidth. To obtain full frequency selectivity gains, feedback is desired for each resource block. However, to reduce feedback overhead, the rank is typically reported for the whole bandwidth, while the precoding matrix is reported for a group of resource blocks, such as four to six resource blocks (referred to as a PMI reporting subband).

Figure 9:
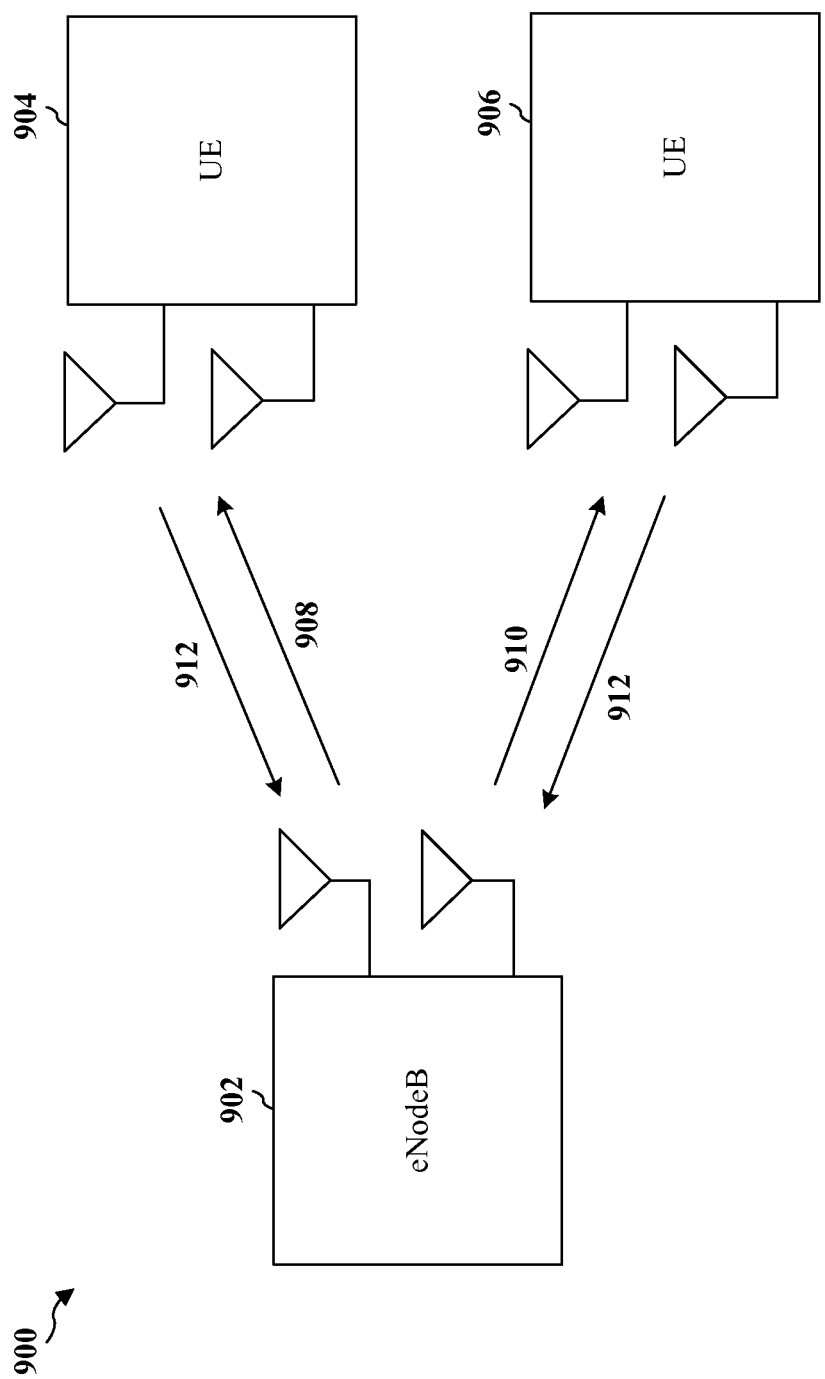
FIG. 9 is a diagram for illustrating MU-MIMO.
Figure 11:
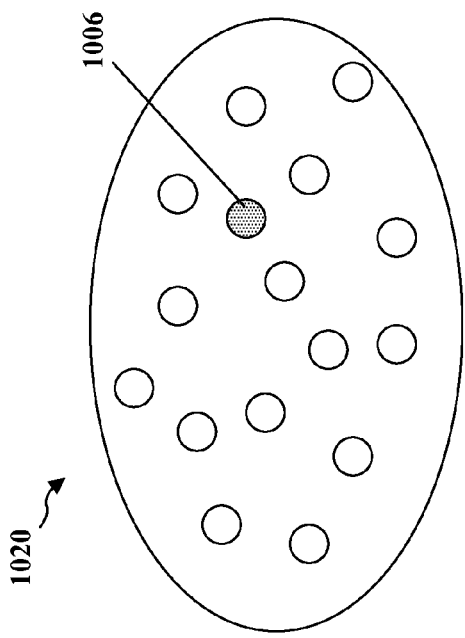
FIGS. 10-13 are diagrams illustrating an exemplary method for providing feedback for MIMO operation.
Figure 13:
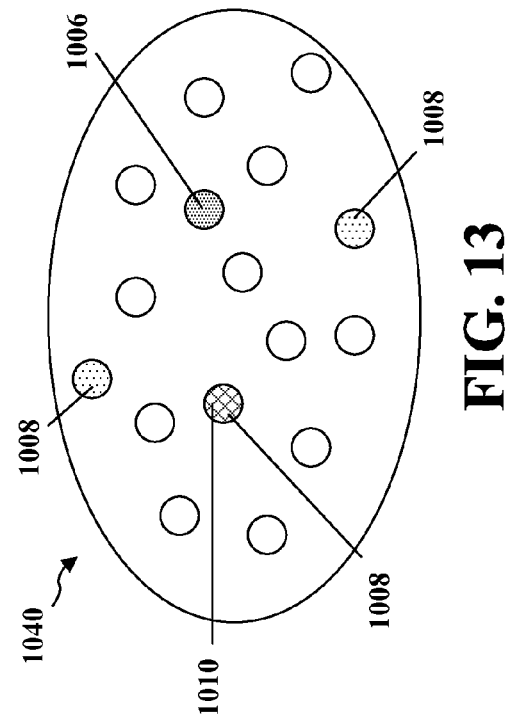
Figure 10:
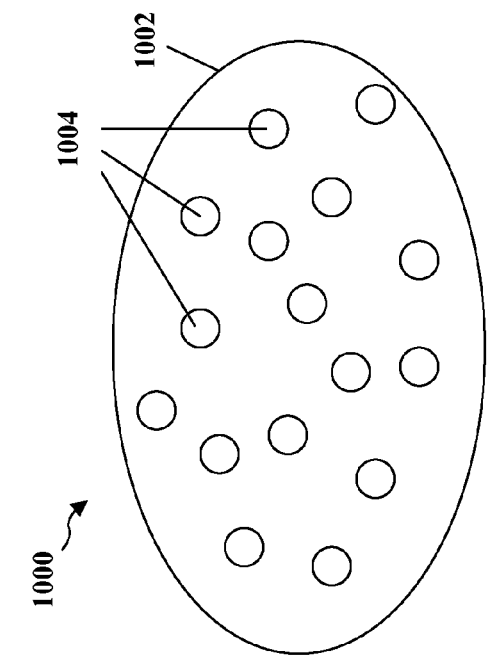
Figure 12:
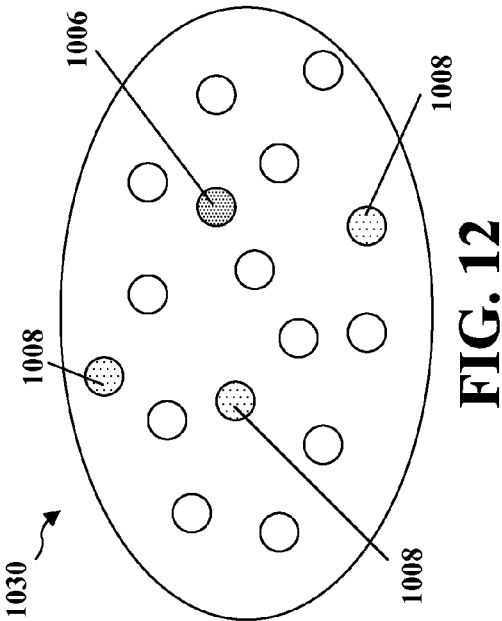

FIG. 9 is a diagram 900 for illustrating MU-MIMO. As shown in FIG. 9, a eNodeB 902 is transmitting simultaneously the data stream 908 to a UE 904 and the data stream 910 to a UE 906. Both the UE 904 and the UE 906 send channel information feedback 912 to the eNodeB 902 so that the eNodeB 902 can adjust the scaling of the beams to improve performance. Using the same feedback for MU-MIMO as used with SU-MIMO would be desirable. However, the current PMI feedback designed for SU-MIMO may not perform well for MU-MIMO. For example, the best beam 908 for MU-MIMO may not be identical to either of the best beams 806, 808 for SU-MIMO. Further, if the PMI reporting granularity is large and the eNodeB 902 needs to schedule a UE on a few resource blocks, the reported PMI may not be the best choice and the reported CQI could be off. As such, a feedback approach is needed to alleviate the aforementioned issues while balancing SU-MIMO requirements.

For MU-MIMO, the channel information feedback may be channel direction information (CDI), also known as channel Eigen vectors. The channel Eigen vectors are computed as the Eigen vectors of the covariance matrix equal to Avg(H*H), where H is an $N_r \times N_t$ channel response matrix and the averaging is performed over the PMI reporting subband on the Hermitian conjugate of H multiplied by H. The covariance matrix Avg(H*H) is equal to E*ΛE, where E=[$e_1\ e_2\ \ldots\ e_{Nt}$] are the set of Eigen vectors of Avg(H*H) and Λ is a diagonal matrix with diagonal elements $\lambda_i$, which are the Eigen values of Avg(H*H). The covariance matrix Avg(H*H), E, and Λ are each $N_t \times N_t$ matrices. The Eigen vectors $e_i$ are each an $N_t \times 1$ matrix. The Eigen vectors can be found from Avg(H*H) using Eigen decomposition, singular value decomposition (SVD), etc. Here we assume that the Eigen vectors are ordered by the Eigen values, and thus $\lambda_1 > \lambda_2 > \ldots > \lambda_{Nt}$.

The Eigen vectors may be quantized in order to limit the feedback overhead. In case of a rank r report, one method to quantize the r Eigen vectors is to report the codebook index j that maximizes $\sum_{i=1}^{r} \lambda_i |e^*_i C_i^{(j)}|$, where $\lambda_i$ is the $i^{th}$ Eigen value of the channel, $e_i$ is the $i^{th}$ Eigen vector of the channel ($e^*_i$ is a 1×$N_r$ matrix), $C^{(j)}$ is the $j^{th}$ precoding matrix ($C_i^{(j)}$ is an $N_t$×1 matrix), and $C_i^{(j)}$ is the $i^{th}$ column in the $j^{th}$ precoding matrix ($C_i^{(j)}$ is an $N_t$×1 matrix) corresponding to a particular beam. For codebook index j, the transmitted signal is equal to $C^{(j)}X$, where X is the vector or transmitted modulation symbols (X is an r×1 matrix). However, picking the codebook that quantizes the Eigen vectors well may have some loss when this feedback is used for SU-MIMO.

In an exemplary method, in order to control the loss for SU-MIMO, the feedback may be computed by finding the best precoding matrix (e.g., the precoding matrix that maximizes the sum rate discussed supra). Next, precoding matrices that have a tolerable expected loss with respect to the best precoding matrix are identified. For example, the UE may identify all codebooks that have a sum throughput which is at least x % of the best sum rate. The best precoding matrix and the precoding matrices that have a tolerable expected loss define a subset of precoding matrices S. Next, the UE determines the Eigen vectors of the channel and selects the precoding matrix in S that best quantizes the Eigen vectors. As subchannel information feedback, the UE reports the codebook corresponding to the selected precoding matrix. The aforementioned exemplary method and additional related methods are discussed further infra.

FIG. 10, FIG. 11, FIG. 12, and FIG. 13 are diagrams for illustrating a first exemplary method for providing feedback. As shown in diagram 1000 of FIG. 10, the UE has a set of precoding matrices 1002 from which to select one of the precoding matrices 1004. As shown in diagram 1020 of FIG. 11, the UE determines that the precoding matrix 1006 has a highest throughput based on received reference signals. As shown in diagram 1030 of FIG. 12, the UE determines a subset S of precoding matrices 1008, 1006 with a throughput greater than a fraction of the highest throughput based on the reference signals. The remaining precoding matrices in the set of precoding matrices 1002 have a throughput less than said fraction of the highest throughput. The fraction may be x %, where 0<x<100. Next, as shown in diagram 1040 of FIG. 13, the UE selects one of the precoding matrices 1010 from the subset S of precoding matrices 1006, 1008 based on a metric. The aforementioned throughputs may be an SU-MIMO throughput. After selecting the precoding matrix 1010, the UE determines a codebook index corresponding to the precoding matrix 1010 and sends the determined codebook index to the serving eNodeB.

In one configuration, the metric may be a function of channel direction information and the precoding matrix. That is, the UE may determine the channel Eigen vectors and channel Eigen values based on the received reference signals. The UE may then compute the sum $\sum_{i=1}^{r} \lambda_i |e^*_i C_i|$ for each precoding matrix C in the subset S of precoding matrices. The sum is a measure of an inaccuracy of quantizing the channel direction information using the precoding matrix C. The UE may then select the precoding matrix $C_s$ that maximizes the sum. The selected precoding matrix $C_s$ is a precoding matrix with a SU-MIMO throughput greater than x % of the best SU-MIMO throughput that best quantizes (i.e., has the least inaccuracy of quantizing) the channel direction information.

Alternatively, the UE may select a precoding matrix different from $C_s$ in the subset S of precoding matrices that has a greater inaccuracy of quantizing the channel direction information than the precoding matrix $C_s$, but with a higher SU-MIMO throughput than provided by the precoding matrix $C_s$. In such a configuration, the metric may be a two-variate function based on a weighted sum equal to a first weight multiplied by an inaccuracy of quantizing the channel direction information using the precoding matrix and a second weight multiplied by the throughput corresponding to the precoding matrix.

FIG. 14, FIG. 15, FIG. 16, and FIG. 17 are diagrams for illustrating a second exemplary method for providing feedback. According to the second exemplary method, instead of choosing the precoding matrix that has the best performance, a subset S of precoding matrices are found that have a tolerable expected loss for the wideband data allocation, and among the subset S, a precoding matrix is selected with a performance that has the least variance across the resource blocks to improve the performance with smaller allocations. Other metrics such as a largest minimum capacity across resource blocks may also be used.

According to the second exemplary method, as shown in diagram 1100 of FIG. 14, a plurality of subcarriers $S_0$ includes a plurality of subsets of subcarriers $S_1, S_2, S_3, S_4$. The plurality of subcarriers $S_0$ are contiguous and the plurality of subsets of the subcarriers $S_1, S_2, S_3, S_4$ are contiguous and nonoverlapping. In one configuration, each subset of the subcarriers corresponds to a resource block with twelve subcarriers. As shown in diagram 1120 of FIG. 15, assume the set of possible precoding matrices 1102 includes ten precoding matrices $C_0$ through $C_9$. Then, as shown in diagram 1140 of FIG. 16, for each precoding matrix $C_0$ through $C_9$ in the set of precoding matrices 1102, the UE determines a throughput (e.g., SU-MIMO throughput) for each of the subsets of subcarriers $S_1, S_2, S_3, S_4$ based on channel estimates for the subsets of the subcarriers. The channel estimates are determined based on reference signals in each of the corresponding subsets of the subcarriers $S_1, S_2, S_3, S_4$. As such, for the precoding matrix $C_0$, the UE determines the SU-MIMO throughput for the subset of subcarriers $S_1$ based on a channel estimate. The UE proceeds to determine the SU-MIMO throughput for the remaining subsets of subcarriers $S_2, S_3, S_4$. The UE performs this calculation for each of the remaining precoding matrices $C_1$ through $C_9$. The UE then determines a combined throughput for the plurality of subcarriers based on the determined throughputs. As shown in diagram 1160 of FIG. 17, the UE determines that the precoding matrix $C_0$ has the highest combined throughput (390% according to FIG. 16). The UE then determines that the subset S of precoding matrices $C_0$, $C_1$, $C_2$, and $C_8$ have a combined throughput greater than a fraction of the combined highest throughput. For example, if the fraction is 8/10 or 80%, then the precoding matrices with a combined throughput of greater than 312% (390%*80%) are determined to be in the subset S.

After the subset S of precoding matrices are determined with a combined throughput greater than a fraction of the combined highest throughput, for each precoding matrix in the subset S of precoding matrices, the UE determines a metric that is a function of the throughput across the subsets of subcarriers. The metric may be a variance of the throughput across the subset of subcarriers. In such a configuration, the UE selects the precoding matrix that minimizes the variance. For example, the precoding matrix $C_1$ has no variance of the throughput across the subset of subcarriers, and therefore the UE would select the precoding matrix $C_1$, assuming the precoding matrix $C_2$ and the precoding matrix $C_8$ have a variance of throughput across the subset of subcarriers. Alternatively, the metric may be a minimum of the throughput across the subset of subcarriers. In such a configuration, the UE selects the precoding matrix that maximizes the minimum of the throughput across the subset of subcarriers. For example, if the throughput for the precoding matrix $C_2$ was 97%, 98%, 99%, 97% through the subset of subcarriers $S_1$, $S_2$, $S_3$, $S_4$, respectively, and the throughput for the precoding matrix $C_8$ was 99%, 99%, 99%, 70% through the subset of subcarriers $S_1$, $S_2$, $S_3$, $S_4$, respectively, then the UE would select the precoding matrix $C_2$, as the minimum across the subset of subcarriers $S_1$, $S_2$, $S_3$, $S_4$ is 97%.

Figure 18:
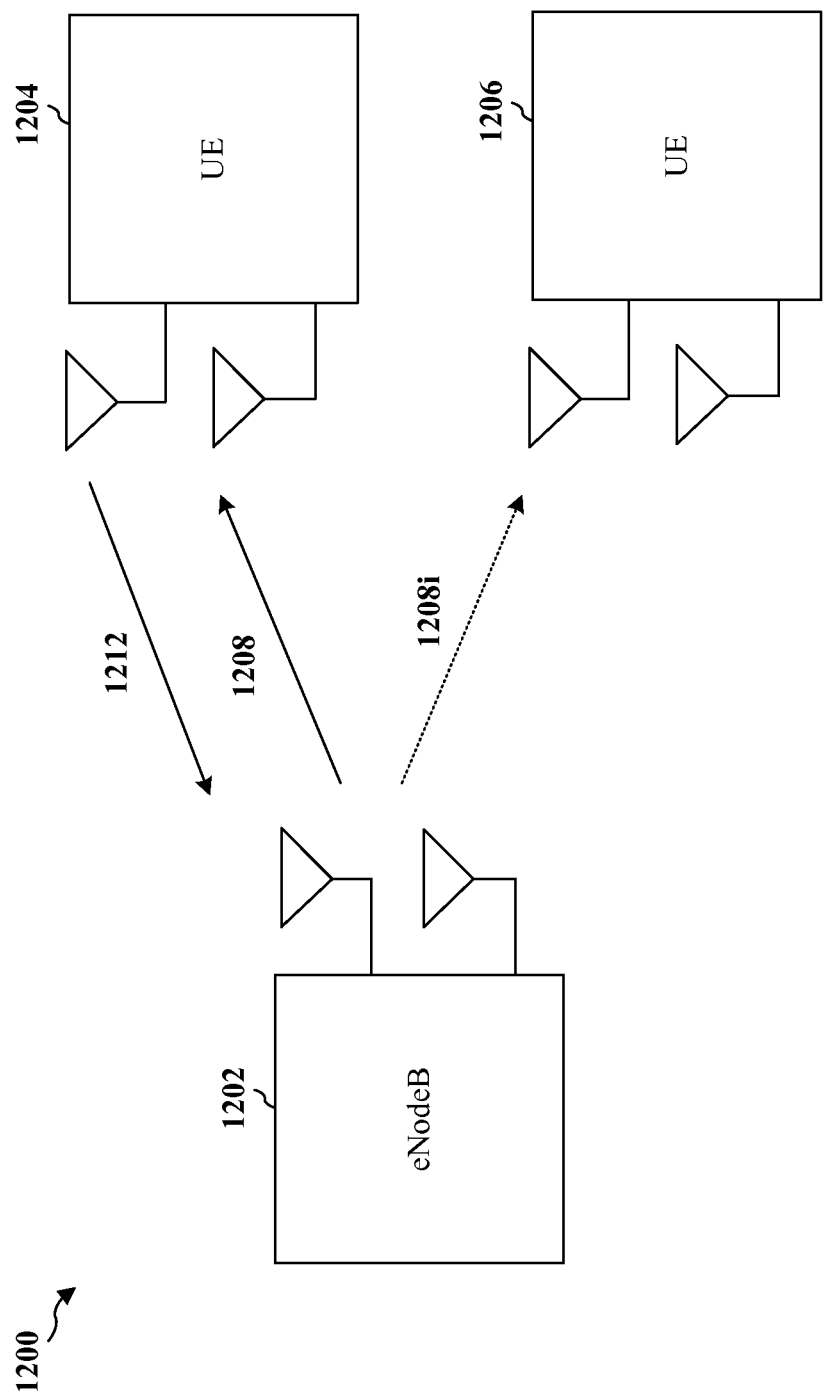
FIG. 18 is a diagram illustrating another exemplary method for providing feedback for MIMO operation.

FIG. 18 is a diagram 1200 for illustrating a third exemplary method for providing feedback. The aforementioned method may be applied to coordinated multipoint (CoMP) transmission/reception, such as when the UE needs to select its PMI while minimizing interference to other UEs. As shown in FIG. 18, an eNodeB 1202 is transmitting a beam 1208 to a UE 1204. The transmission of the beam 1208 is causing interference 1208i at a UE 1206, which is communicating with a different eNodeB. According to the exemplary method, the UE 1204 determines channel conditions for the UE 1206, and selects the precoding matrix based on the determined channel conditions and the precoding matrix. The UE sends back codebook information 1212 corresponding to the selected precoding matrix. In one configuration, for each precoding matrix in the subset S of precoding matrices, based on the determined channel conditions for the UE 1206, the UE 1204 determines an interference 1208i to the UE 1206 as a result of a eNodeB 1202 transmitting using the precoding matrix. In such a configuration, the metric for selecting the precoding matrix is the interference to the UE 1206, and the precoding matrix is selected based on minimizing the interference to the UE 1206.

Figure 19:
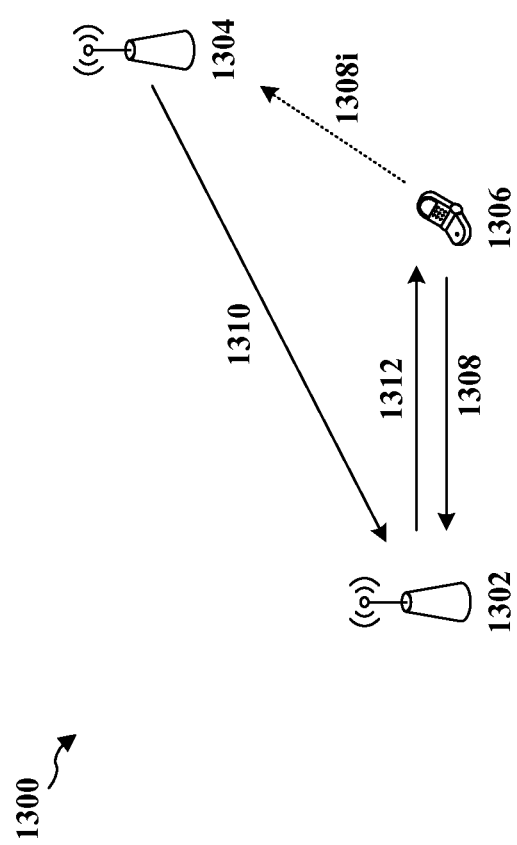
FIG. 19 is a diagram for illustrating another exemplary method for providing feedback for MIMO operation.

FIG. 19 is a diagram 1300 for illustrating a fourth exemplary method for providing feedback. As shown in FIG. 19, a UE 1306 transmits a signal 1308 in UL to an eNodeB 1302 that causes interference 1308i to another eNodeB 1304. The eNodeB 1304 sends channel information 1310 to the eNodeB 1302. The eNodeB 1302 selects a precoding matrix based on the received channel information 1310 and sends information 1312 (e.g., a codebook) corresponding to the selected precoding matrix that would reduce the interference 1308i to the eNodeB 1304.

Figure 20:
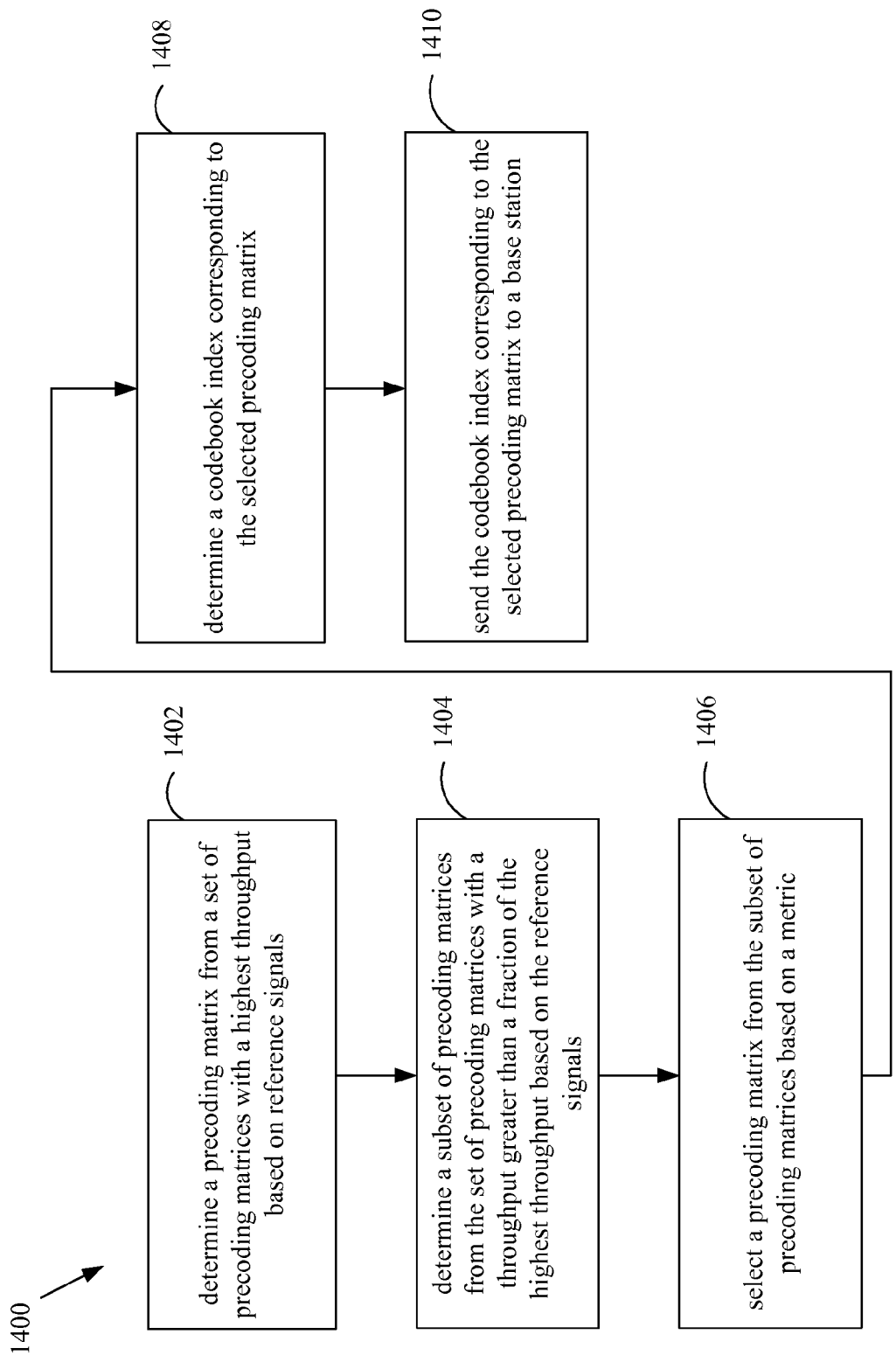
FIG. 20 is a flow chart of a method of wireless communication.

FIG. 20 is a flow chart 1400 of a method of wireless communication. The method may be performed by a UE. According to the method, the UE determines a precoding matrix from a set of precoding matrices with a highest throughput based on reference signals (block 1402). In addition, the UE determines a subset of precoding matrices from the set of precoding matrices with a throughput greater than a fraction of the highest throughput based on the reference signals (block 1404). Furthermore, the UE selects a precoding matrix from the subset of precoding matrices based on a metric (block 1406). Subsequently, the UE may determine a codebook index corresponding to the selected precoding matrix (block 1408). The UE may then send the codebook index corresponding to the selected precoding matrix to a base station (block 1410). The throughput may be an SU-MIMO throughput.

Figure 21:
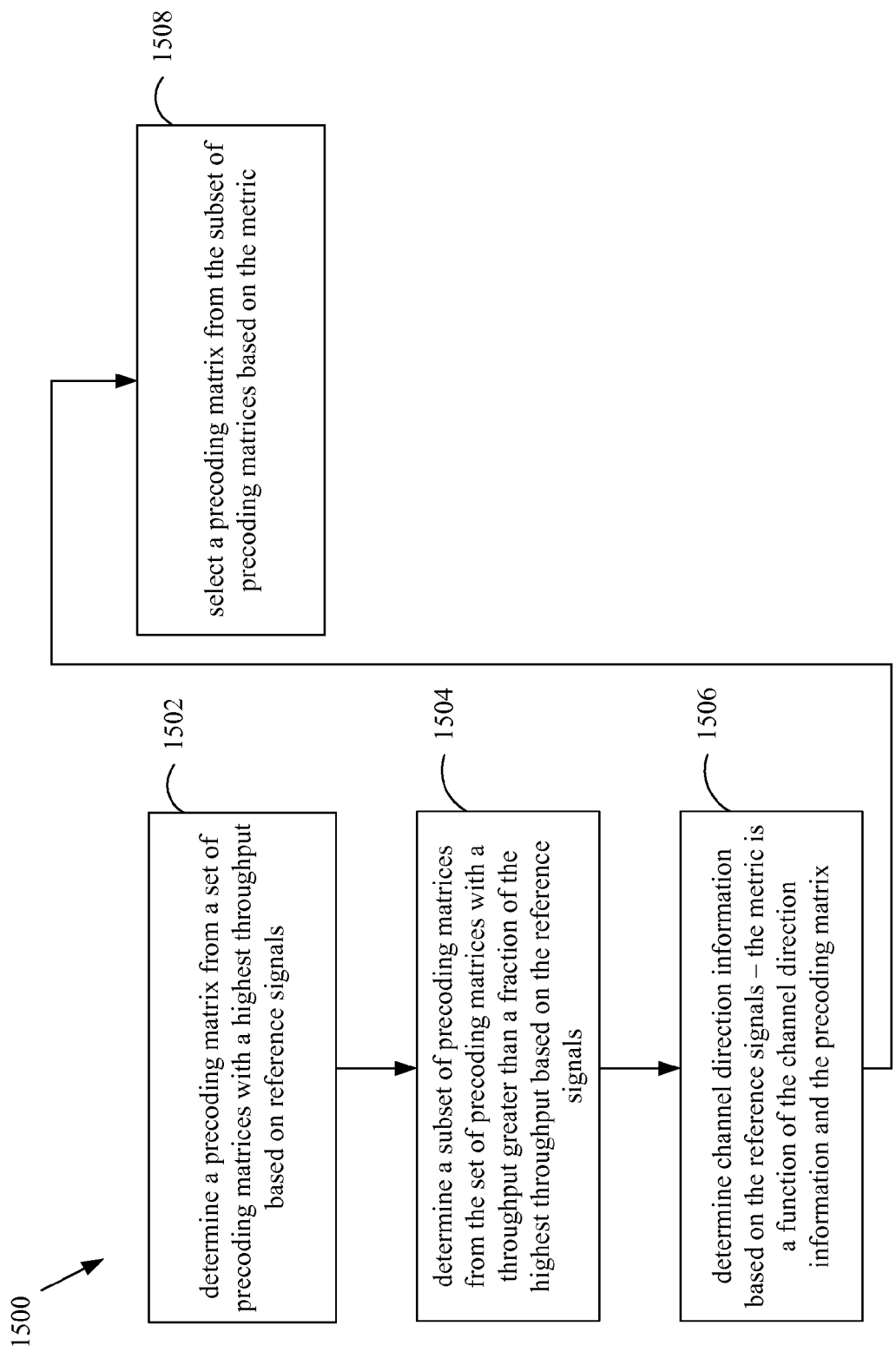
FIG. 21 is a flow chart of another method of wireless communication.

FIG. 21 is a flow chart 1500 of another method of wireless communication. According to the method, the UE determines a precoding matrix from a set of precoding matrices with a highest throughput based on reference signals (block 1502). The UE determines a subset of precoding matrices from the set of precoding matrices with a throughput greater than a fraction of the highest throughput based on the reference signals (block 1504). The UE may then determine channel direction information (e.g., channel Eigen vectors and channel Eigen values) based on the reference signals (block 1506). The aforementioned metric may be a function of the channel direction information and the precoding matrix (block 1506). The UE then selects a precoding matrix from the subset of precoding matrices based on the metric (block 1508).

Figure 22:
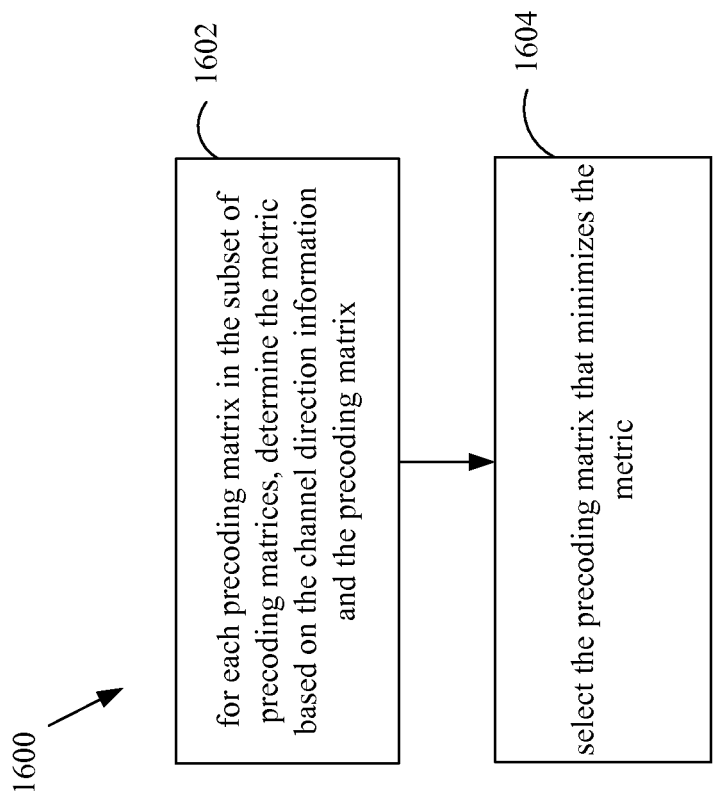
FIG. 22 is a flow chart of another method of wireless communication.

FIG. 22 is a flow chart 1600 of another method of wireless communication. According to the method, the UE selects the precoding matrix (in block 1402 and 1508) by determining the metric based on the channel direction information and the precoding matrix for each precoding matrix in the subset of precoding matrices (block 1602). The UE selects the precoding matrix that minimizes the metric (block 1604). The metric may be a measure of an inaccuracy of quantizing the channel direction information using the precoding matrix. Alternatively, the metric may be based on a weighted sum equal to a first weight multiplied by an inaccuracy of quantizing the channel direction information using the precoding matrix and a second weight multiplied by the throughput corresponding to the precoding matrix.

Figure 23:
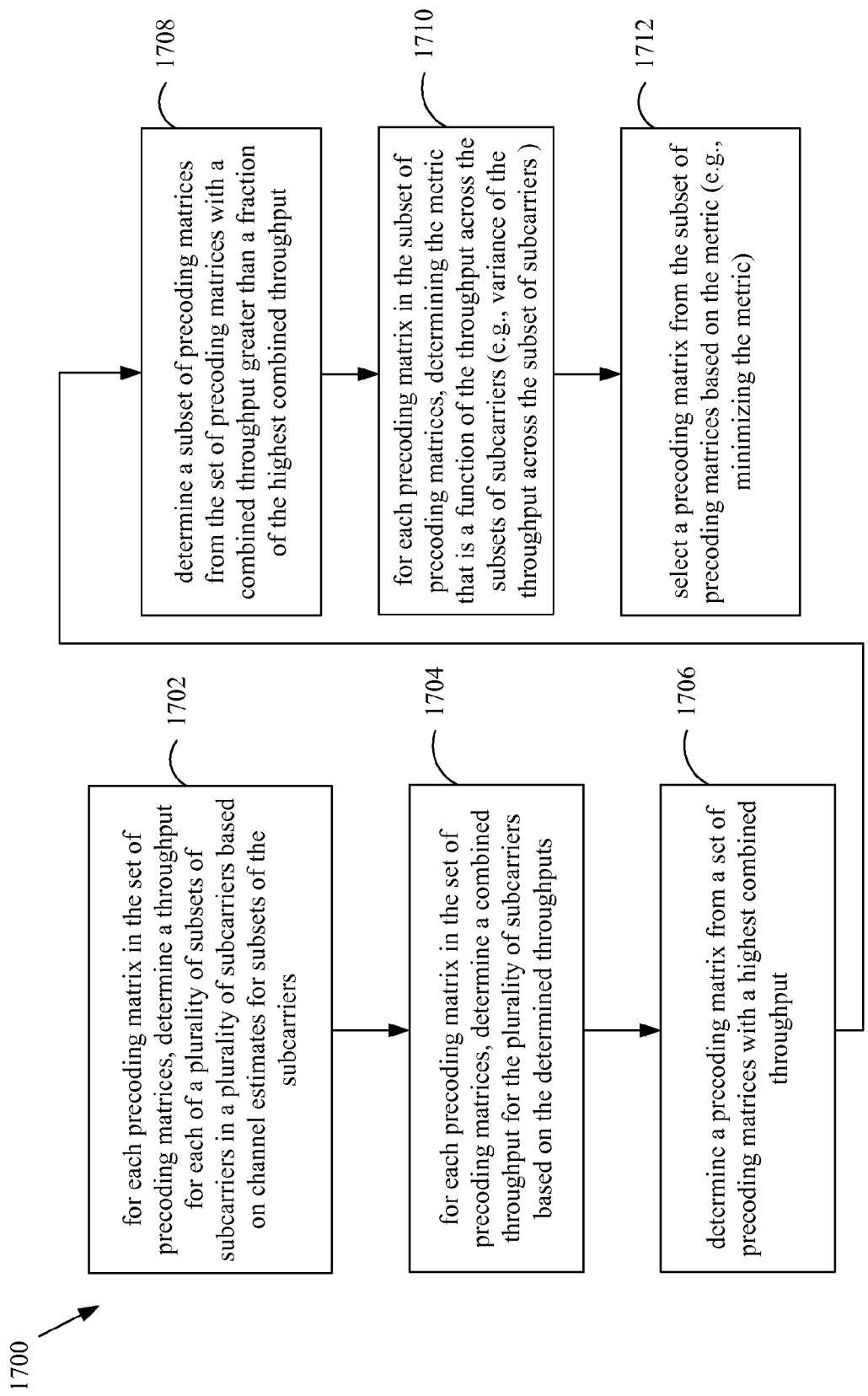
FIG. 23 is a flow chart of another method of wireless communication.

FIG. 23 is a flow chart 1700 of another method of wireless communication. According to the method, for each precoding matrix in the set of precoding matrices, the UE determines a throughput for each of a plurality of subsets of subcarriers in a plurality of subcarriers based on channel estimates for the subsets of the subcarriers (block 1702) and determines a combined throughput for the plurality of subcarriers based on the determined throughputs (block 1704). The UE determines a precoding matrix from a set of precoding matrices with a highest combined throughput (block 1706). The UE determines a subset of precoding matrices from the set of precoding matrices with a combined throughput greater than a fraction of the highest combined throughput (block 1708). For each precoding matrix in the subset of precoding matrices, the UE determines the metric that is a function of the throughput across the subsets of subcarriers (block 1710). The UE selects a precoding matrix from the subset of precoding matrices based on the metric (block 1712).

The plurality of subcarriers may be contiguous and the plurality of subsets of the subcarriers may be contiguous and nonoverlapping. Each subset of the subcarriers may correspond to a resource block with twelve subcarriers. The metric may be a variance of the throughput across the subset of subcarriers. In such a configuration, the UE may select the precoding matrix based on minimizing the metric. Alternatively, the metric may be a minimum of the throughput across the subset of subcarriers. In such a configuration, the UE may select the precoding matrix based on maximizing the metric.

Figure 24:
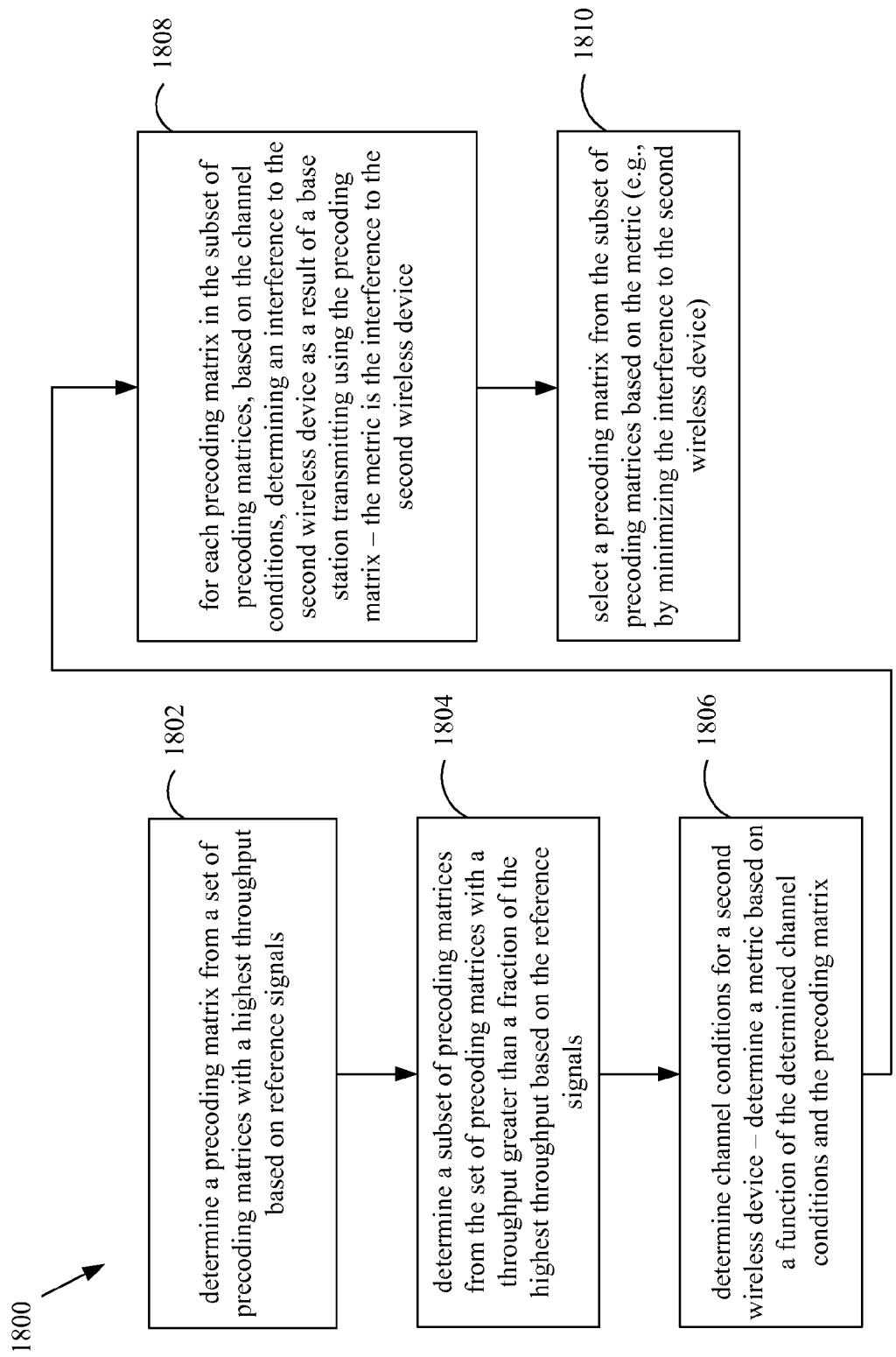
FIG. 24 is a flow chart of another method of wireless communication.

FIG. 24 is a flow chart 1800 of a method of wireless communication. According to the method, the UE determines a precoding matrix from a set of precoding matrices with a highest throughput based on reference signals (block 1802). The UE determines a subset of precoding matrices from the set of precoding matrices with a throughput greater than a fraction of the highest throughput based on the reference signals (block 1804). The UE determines channel conditions for a second wireless device (block 1806). A metric is determined based on a function of the determined channel conditions and the precoding matrix (block 1806). For each precoding matrix in the subset of precoding matrices, based on the channel conditions, the UE determines an interference to the second wireless device as a result of a base station transmitting using the precoding matrix (block 1808). The metric is then determined to be the interference to the second wireless device (block 1808). The UE selects a precoding matrix from the subset of precoding matrices based on the metric (block 1810). For example, the UE may select the precoding matrix based on minimizing the interference to the second wireless device.

Figure 25:
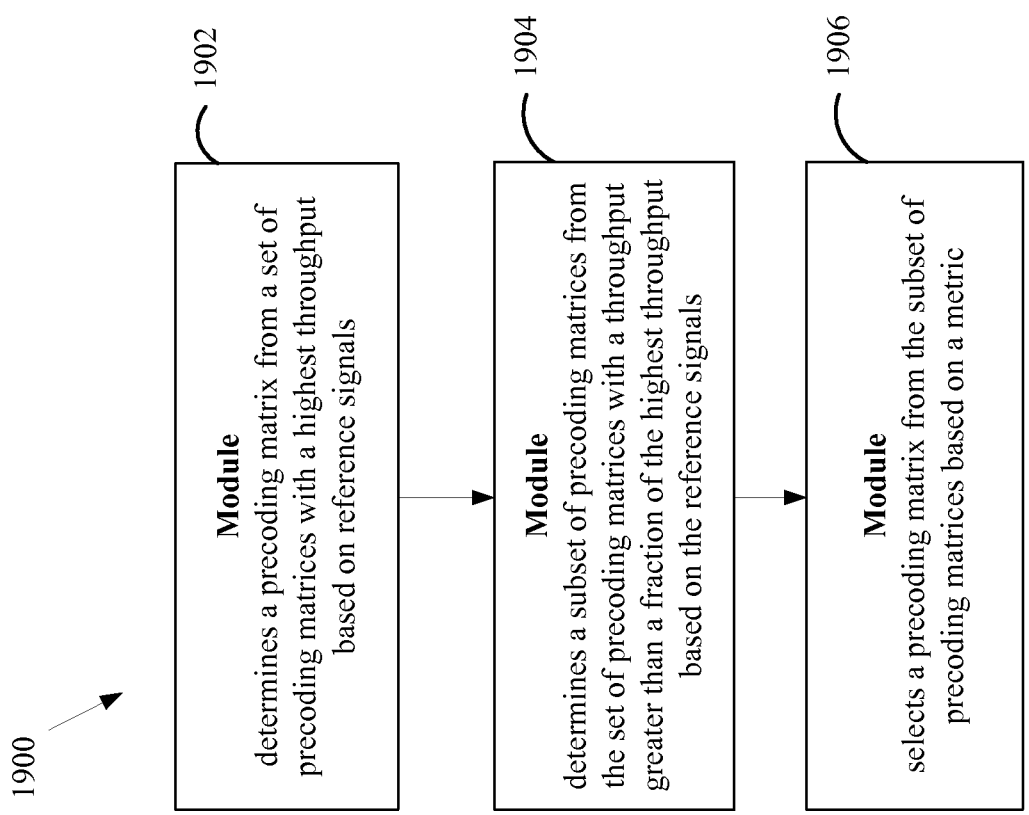
FIG. 25 is a block diagram illustrating functionality of an exemplary apparatus.

FIG. 25 is a conceptual block diagram 1900 illustrating the functionality of an exemplary apparatus (such as apparatus 100 of FIG. 1). The apparatus 100 includes a module 1902 that determines a precoding matrix from a set of precoding matrices with a highest throughput based on reference signals. The apparatus 100 further includes a module 1904 that determines a subset of precoding matrices from the set of precoding matrices with a throughput greater than a fraction of the highest throughput based on the reference signals. The apparatus 100 further include a module 1906 that selects a precoding matrix from the subset of precoding matrices based on a metric.

In one configuration, the apparatus 100 for wireless communication includes means for means for determining a precoding matrix from a set of precoding matrices with a highest throughput based on reference signals, means for determining a subset of precoding matrices from the set of precoding matrices with a throughput greater than a fraction of the highest throughput based on the reference signals, and means for selecting a precoding matrix from the subset of precoding matrices based on a metric.

The apparatus 100 may further include means for sending information corresponding to the selected precoding matrix to a base station. The apparatus 100 may further include means for determining a codebook index corresponding to the selected precoding matrix. In such a configuration, the sent information corresponds to the determined codebook index.

The apparatus 100 may further include means for determining channel direction information based on the reference signals. In such a configuration, the metric is a function of the channel direction information and the precoding matrix. The means for selecting the precoding matrix may include means for determining the metric based on the channel direction information and the precoding matrix for each precoding matrix in the subset of precoding matrices, and means for selecting the precoding matrix that minimizes the metric. For each precoding matrix in the set of precoding matrices, the apparatus 100 may further include means for determining a throughput for each of a plurality of subsets of subcarriers in a plurality of subcarriers based on reference signals in each of the subsets of the subcarriers, and means for determining a combined throughput for the plurality of subcarriers based on the determined throughputs. In such a configuration, the precoding matrix is determined from the set of precoding matrices with a highest combined throughput, and the subset of precoding matrices is determined from the set of precoding matrices with the combined throughput greater than a fraction of the combined highest throughput. For each precoding matrix in the subset of precoding matrices, the apparatus 100 may further include means for determining the metric that is a function of the throughput across the subsets of subcarriers. In such a configuration, the precoding matrix is selected based on the metric.

The apparatus 100 may further include means for determining channel conditions for a second wireless device. In such a configuration, the metric is a function of the determined channel conditions and the precoding matrix. For each precoding matrix in the subset of precoding matrices, based on the channel conditions, the apparatus 100 may further include means for determining an interference to the second wireless device as a result of a base station transmitting using the precoding matrix. In such a configuration, the metric is the interference to the second wireless device, and the precoding matrix is selected based on minimizing the interference to the second wireless device. The aforementioned means may include the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication, comprising:
    determining, based on a reference signal, a first precoding matrix from a set of precoding matrices, the first precoding matrix having a first single-user multiple input multiple output (SU-MIMO) throughput that comprises a combined throughput for a plurality of subcarriers;
    determining, from the set of precoding matrices, a subset of precoding matrices each having a second SU-MIMO throughput that is greater than a fraction of the first SU-MIMO throughput, wherein the second SU-MIMO throughput comprises a combined throughput for the plurality of subcarriers, and wherein the fraction comprises a ratio of the first SU-MIMO throughput to the second SU-MIMO throughput; and
    selecting, from the subset of precoding matrices, a second precoding matrix for a multiple user multiple input multiple output (MU-MIMO) transmission based on a metric associated with a throughput variance across the plurality of subcarriers, wherein the metric includes a measure of an inaccuracy of quantizing a channel direction information determined using the second precoding matrix.

2. The method of claim 1, further comprising sending information corresponding to the second precoding matrix to a base station.

3. The method of claim 2, further comprising determining a codebook index corresponding to the second precoding matrix, wherein the sent information corresponds to the determined codebook index.

4. The method of claim 1, further comprising determining the channel direction information based on the reference signal, wherein the metric is a function of the channel direction information and the second precoding matrix.

5. The method of claim 4, wherein the channel direction information comprises channel Eigen vectors and channel Eigen values.

6. The method of claim 4, wherein the selecting the second precoding matrix comprises:
for each one of the precoding matrices in the subset of precoding matrices, determining the metric based on the channel direction information and the one of the precoding matrices; and
selecting the second precoding matrix that minimizes the metric.

7. The method of claim 6, wherein the metric is based on a weighted sum equal to a first weight multiplied by an inaccuracy of quantizing the channel direction information using the second precoding matrix and a second weight multiplied by a throughput corresponding to the second precoding matrix.

8. The method of claim 1, wherein for each precoding matrix in the set of precoding matrices, the method further comprises:
determining a throughput for each of a plurality of subsets of subcarriers in the plurality of subcarriers based on channel estimates for the subsets of the subcarriers; and
determining the combined throughput for the plurality of subcarriers based on the determined throughputs;
wherein the first precoding matrix is determined from the set of precoding matrices with a highest combined throughput, the subset of precoding matrices is determined from the set of precoding matrices with the combined throughput greater than a fraction of the highest combined throughput.

9. The method of claim 8, wherein the plurality of subcarriers are contiguous and the plurality of subsets of the subcarriers are contiguous and nonoverlapping.

10. The method of claim 8, further comprising: for each precoding matrix in the subset of precoding matrices, determining the metric that is a function of the throughput across the subsets of subcarriers.

11. The method of claim 10, wherein the second precoding matrix is selected based on minimizing the metric.

12. The method of claim 10, wherein the metric is a minimum of the throughput across the subset of subcarriers, and the second precoding matrix is selected based on maximizing the metric.

13. The method of claim 1, further comprising determining channel conditions for a wireless device, wherein the metric is a function of the determined channel conditions and the second precoding matrix.

14. The method of claim 13, further comprising: for each precoding matrix in the subset of precoding matrices, based on the channel conditions, determining an interference to the wireless device as a result of a base station transmitting using the second precoding matrix, wherein the metric is the interference to the wireless device, and the second precoding matrix is selected based on minimizing the interference to the wireless device.

15. An apparatus for wireless communication, comprising:
means for determining, based on a reference signal, a first precoding matrix from a set of precoding matrices, the first precoding matrix having a first single-user multiple input multiple output (SU-MIMO) throughput that comprises a combined throughput for a plurality of subcarriers;
means for determining, from the set of precoding matrices, a subset of precoding matrices each having a second SU-MIMO throughput that is greater than a fraction of the first SU-MIMO throughput, wherein the second SU-MIMO throughput comprises a combined throughput for the plurality of subcarriers, and wherein the fraction comprises a ratio of the first SU-MIMO throughput to the second SU-MIMO throughput; and
means for selecting, from the subset of precoding matrices, a second precoding matrix for a multiple user multiple input multiple output (MU-MIMO) transmission based on a metric associated with a throughput variance across the plurality of subcarriers, wherein the metric includes a measure of an inaccuracy of quantizing a channel direction information determined using the second precoding matrix.

16. The apparatus of claim 15, further comprising means for sending information corresponding to the second precoding matrix to a base station.

17. The apparatus of claim 16, further comprising means for determining a codebook index corresponding to the second precoding matrix, wherein the sent information corresponds to the determined codebook index.

18. The apparatus of claim 15, further comprising means for determining the channel direction information based on the reference signal, wherein the metric is a function of the channel direction information and the second precoding matrix.

19. The apparatus of claim 18, wherein the channel direction information comprises channel Eigen vectors and channel Eigen values.

20. The apparatus of claim 18, wherein the means for selecting the second precoding matrix comprises:
means for determining the metric based on the channel direction information and one of the precoding matrices for each one of the precoding matrices in the subset of precoding matrices; and
means for selecting the second precoding matrix that minimizes the metric.

21. The apparatus of claim 20, wherein the metric is based on a weighted sum equal to a first weight multiplied by an inaccuracy of quantizing the channel direction information using the second precoding matrix and a second weight multiplied by a throughput corresponding to the second precoding matrix.

22. The apparatus of claim 15, wherein for each precoding matrix in the set of precoding matrices, the apparatus further comprises:
means for determining a throughput for each of a plurality of subsets of subcarriers in the plurality of subcarriers based on channel estimates for the subsets of the subcarriers; and
means for determining the combined throughput for the plurality of subcarriers based on the determined throughputs;
wherein the first precoding matrix is determined from the set of precoding matrices with a highest combined throughput, the subset of precoding matrices is determined from the set of precoding matrices with the combined throughput greater than a fraction of the highest combined throughput.

23. The apparatus of claim 22, wherein the plurality of subcarriers are contiguous and the plurality of subsets of the subcarriers are contiguous and nonoverlapping.

24. The apparatus of claim 22, further comprising: for each precoding matrix in the subset of precoding matrices, means for determining the metric that is a function of the throughput across the subsets of subcarriers.

25. The apparatus of claim 24, wherein the precoding matrix is selected based on minimizing the metric.

26. The apparatus of claim 24, wherein the metric is a minimum of the throughput across the subset of subcarriers, and the second precoding matrix is selected based on maximizing the metric.

27. The apparatus of claim 15, further comprising means for determining channel conditions for a wireless device, wherein the metric is a function of the determined channel conditions and the second precoding matrix.

28. The apparatus of claim 27, further comprising: for each precoding matrix in the subset of precoding matrices, based on the channel conditions, means for determining an interference to the wireless device as a result of a base station transmitting using the second precoding matrix, wherein the metric is the interference to the wireless device, and the second precoding matrix is selected based on minimizing the interference to the wireless device.

29. A computer program product, comprising:
a non-transitory computer-readable medium comprising instructions for causing at least one computer to:
determine, based on a reference signal, a first precoding matrix from a set of precoding matrices, the first precoding matrix having a first single-user multiple input multiple output (SU-MIMO) throughput that comprises a combined throughput for a plurality of subcarriers;
determine, from the set of precoding matricies, a subset of precoding matrices each having a second SU-MIMO throughput that is greater than a fraction of the first SU-MIMO throughput, wherein the second SU-MIMO throughput comprises a combined throughput for the plurality of subcarriers, and wherein the fraction comprises a ratio of the first SU-MIMO throughput to the second SU-MIMO throughput; and
select, from the subset of precoding matrices, a second precoding matrix for a multiple user multiple input multiple output (MU-MIMO) transmission metric based on a metric associated with a throughput variance across the plurality of subcarriers, wherein the metric includes a measure of an inaccuracy of quantizing a channel direction information determined using the second precoding matrix.

30. The computer product of claim 29, wherein for each precoding matrix in the set of precoding matrices, further comprising instructions for causing the at least one computer to:
determine a throughput for each of a plurality of subsets of subcarriers in the plurality of subcarriers based on channel estimates for the subsets of the subcarriers; and
determine the combined throughput for the plurality of subcarriers based on the determined throughputs;
wherein the first precoding matrix is determined from the set of precoding matrices with a highest combined throughput, the subset of precoding matrices is determined from the set of precoding matrices with the combined throughput greater than a fraction of the highest combined throughput.

31. The computer product of claim 30, wherein for each precoding matrix in the subset of precoding matrices, further comprising instructions for causing the at least one computer to determine the metric that is a function of the throughput across the subsets of subcarriers.

32. The computer product of claim 31, wherein the second precoding matrix is selected based on minimizing the metric.

33. The computer product of claim 29, further comprising instructions for causing the at least one computer to determine the channel direction information based on the reference signal, wherein the metric is a function of the channel direction information and the second precoding matrix.

34. An apparatus for wireless communication, comprising:
a processor; and
memory coupled to the processor, wherein the processor is configured to:
determine, based on a reference signal, a first precoding matrix from a set of precoding matrices, the first precoding matrix having a first single-user multiple input multiple output (SU-MIMO) throughput that comprises a combined throughput for a plurality of subcarriers;
determine, from the set of precoding matricies, a subset of precoding matrices each having a second SU-MIMO throughput that is greater than a fraction of the first SU-MIMO throughput, wherein the second SU-MIMO throughput comprises a combined throughput for the plurality of subcarriers, and wherein the fraction comprises a ratio of the first SU-MIMO throughput to the second SU-MIMO throughput; and
select, from the subset of precoding matrices, a second precoding matrix for a multiple user multiple input multiple output (MU-MIMO) transmission based on a metric associated with a throughput variance across the plurality of subcarriers, wherein the metric includes a measure of an inaccuracy of quantizing a channel direction information determined using the second precoding matrix.

35. The apparatus of claim 34, wherein the first throughput is a highest throughput.

36. The apparatus of claim 34, wherein the processing system is further configured to determine the channel direction information based on the reference signal, wherein the metric is a function of the channel direction information and the second precoding matrix.

37. The apparatus of claim 36, wherein the channel direction information comprises channel Eigen vectors and channel Eigen values.

* * * * *